United States Patent [19]

Beitchman et al.

[11] 4,250,293

[45] Feb. 10, 1981

[54] LATENT AMINE SALTS OF BIS-PHENOL A

[75] Inventors: Burton D. Beitchman, Springfield; Donald E. Jefferson, Unionville; John P. Seymour, Marcus Hook, all of Pa.

[73] Assignee: Air Products and Chemicals, Inc., Allentown, Pa.

[21] Appl. No.: 21,641

[22] Filed: Mar. 19, 1979

[51] Int. Cl.$^3$ .................... C08G 59/50; C08G 59/62
[52] U.S. Cl. ........................ 528/93; 528/99; 528/104
[58] Field of Search ............ 528/93, 97, 99, 104

[56] References Cited

U.S. PATENT DOCUMENTS

| | | | |
|---|---|---|---|
| 3,284,407 | 11/1966 | Winfield et al. | 260/47 |
| 3,519,576 | 7/1970 | Johnson | 260/2 |
| 3,520,905 | 7/1970 | Johnson | 260/345.2 |

*Primary Examiner*—Earl A. Nielsen
*Attorney, Agent, or Firm*—E. Eugene Innis; Russell L. Brewer

[57] ABSTRACT

This invention relates to epoxy powder coatings which have excellent shelf life at ambient temperature (70° F.) with excellent cure rates at curing temperatures, the epoxy resin containing a latent amine salt of bis-phenol A, the amine represented by the formula:

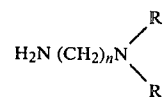

wherein n is 2 or 3, and R is a $C_1$-$C_4$ alkyl group.

8 Claims, No Drawings

LATENT AMINE SALTS OF BIS-PHENOL A

BACKGROUND OF THE INVENTION

1. Field of the Invention

This invention relates to curable epoxy powder compositions, catalysts for curing powder coating epoxy compositions and to a process for curing epoxy powder coatings.

2. Description of the Prior Art

In recent years, there has been a substantial amount of work performed in the development of powder coating compositions for application to a variety of substrates. The use of powder coatings overcomes many of the environmental problems liquid, resinous coating compositions have presented in manufacturing, particularly where a vinyl organic solvent is used as the carrier.

Essentially, two methods of formulating epoxy powder coating systems have been used. One method is to grind the epoxy powder coating and combine it with various additives, pigments and catalysts in a blender and then apply this physical blend to a substrate and cure at elevated temperature, e.g. 270° F.–400° F. The second technique has been to melt mix the epoxy resin with various additives, pigments and catalysts and extrude this melt mix into a thin ribbon and cooling to form a solid. This solid is then ground into a finely divided form, e.g. 250 microns or less, depending upon whether the coating is to be used for decorative or functional purposes. The latter method of formulating epoxy powder coatings has significant advantages in that it permits greater uniformity of dispersion of additives, pigments and catalysts within the resin itself. It also presents the most difficulty in formulation due to the fact that many catalysts are too reactive at the melt mix temperature or else have a high activation temperature thus requiring a high curing temperature.

There are number of patents which disclose the use of various catalyst systems for epoxy powder coatings. Representative of these patents are:

Johnson, U.S. Pat. Nos. 3,519,576 and 3,520,905, which disclose the use of a heat activatable curing agent consisting of a crystalline polyphenate salt of a polyamine and a polyhydric alcohol, e.g. the salt of bisphenol A and triethylenetetramine and the N,N-dimethyl-1,3-propanediamine salt of trimethyltrihydroxyflavan as a latent catalyst for epoxy powder coatings.

Aelony, U.S. Pat. No. 3,352,775 discloses the use of an amine salt of an epoxy resin as a catalyst for curing epoxy resins.

Heer et al U.S. Pat. No. 3,629,181 discloses curing agents of primary diamines, e.g. isophorone diamine with an excess of polyglycidyl ether as a curing agent for epoxy powder coatings.

Winfield et al U.S. Pat. No. 3,284,407 discloses the use of particular accelerators for epoxy resin compositions, the accelerator consisting of a substituted ammonium phenate prepared by heating a phenol with a tertiary amine or quaternary ammonium hydroxide. Suggested accelerator possibilities include the reaction product of bis-phenol A and various tertiary amines, e.g. triethyl amine and triethanol amine.

SUMMARY OF THE INVENTION

This invention relates to a curable powder coating epoxy resin composition consisting of a finely divided 1,2-epoxy resin having a lower softening point of not less than 40° C., the latent activity being imparted to the epoxy powder coating composition by an alkyl substituted polyamine salt of bis-phenol A, the polyamine having the formula:

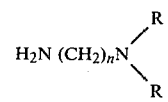

wherein n is 2 or 3, and R is a $C_1$–$C_4$ alkyl group. The catalyst composition is extremely reactive at relatively low cure temperatures, e.g. 270° F., but inactive at lower temperatures thus providing for extended shelf life of the epoxy powder coating composition.

The latent epoxy powder coating composition of this invention has several advantages, and these advantages include:

an extended shelf life at ambient temperatures;

composition which will cure at relatively low activation temperatures, e.g. 270° F., within a short period of time to provide excellent physical properties in the epoxy coating;

a coating composition which will have little to no discoloration on cure; and an epoxy powder coating composition having a relatively high activation temperature to permit melt mixing of conventional epoxy resins with the catalyst and pigments without gelling in the extruder.

DESCRIPTION OF THE PREFERRED EMBODIMENTS

In the practice of this invention, the epoxy resins are those which are solid at room temperature, and preferably those which have a lower melting point of not less than 40° C., and preferably not less than 60° C. These epoxy resins have a plurality of 1,2-epoxy units with an epoxy equivalent weight of from about 500–1,000. Typically, these epoxy resins are of the bis-phenol A type and are formed by reacting dihydroxy compounds with epichlorohydrin in the presence of alkali. Specific examples of dihydroxy compounds which can be used for reaction with epichlorhydrin are 2,2-bis-(4-hydroxyphenyl)-propane; 4,4'-dihydroxybenzophenone; 1,1-bis-(4-hydroxyphenyl)-ethane; bis-(2-hydroxynaphthyl) methane; and 1,5-dihydroxynaphthalene.

The catalyst system which is used in practicing the invention can be described as an amine salt of bis-phenol A. The amine used in forming the salt is represented by the formula:

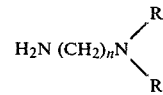

wherein n is 2 or 3, and R is a $C_1$–$C_4$ alkyl group.

Specific examples of amines within this formula include N,N-dimethyl-1,3 propanediamine; N,N-diethyl 1,3-propanediamine and N,N-dimethyl-ethylenediamine.

The selection of a dialkyl substituted polyamine salt of bis-phenol A is unique, particularly with respect to the effect it has on the curing rate of epoxy resin. Other amines in combination with bis-phenol A tend to result in a slower curing rate than does the dialkyl substituted polyamine. For example, the use of other phenolic type materials, e.g. p,p'-diphenol and dihydroxynaphthylene results in substantially slower cure rates. The same is true for various amine salts of bis-phenol A, e.g. triethylenetetramine, etc.

The amine-bis-phenol A salts are formed by reacting substantially stoichiometric quantities of amine with bis-phenol A. For preferred results, the ratio of amine to bis-phenol A is a 1:1 molar basis although, broadly, the ratio preferably is about 0.5–2:1 moles reactive amine per hydroxyl equivalent.

The catalyst is included in the epoxy resin in a proportion sufficient for enhancing the cure rate of the epoxy resin at a temperature of 270° F. Broadly, the catalyst is included in a proportion of from about 1–15 parts per 100 parts (phr) of epoxy resin by weight, and preferably from about 3–10 parts per 100 parts of epoxy resin. Optimum levels within this range may vary depending upon the particular properties of the epoxy powder coating. For example, high viscosity epoxy resins may require a slightly lower level of catalyst or slightly lower cure temperatures in order to reduce the gelation rate and permit flow and coalescence of the resin without pinholes.

The catalyst may also be supplemented with conventional catalysts, e.g. dicyandiamide to give a catalyst which is activated at a higher temperature than the dialkyl substituted polyamine salt of bis-phenol-A. Levels of dicyandiamide generally would be from about 2–9 phr, and preferably from about 2–5.

In preparing the epoxy powder coating systems, conventional additives, pigments, leveling agents commonly used in epoxy coatings can be used as desired. For example, various leveling agents which can be used to enhance the flow of epoxy resin under curing conditions are polymeric or monomeric acetals, such as polyvinyl formal, polyvinyl acetal, diethyl-2-ethylhexanol acetal, di-2-ethylhexyl acid aldehyde-acetal; and polyglycols and polyglycol ether such as polyethylene glycol and polypropylene glycol.

Pigments and additives which can be added to the epoxy resin include titanium dioxide, barytes, antimony oxide, cadmium red and fillers such as calcium carbonate, calcium sulfate, glass fiber and the like.

The following examples are provided to illustrate preferred and best methods of practicing the invention, and are not intended to restrict the scope of the invention.

EXAMPLE 1

A 0.05 mole sample of bis-phenol A was dissolved in an ethanol-water solution containing 95% ethanol. This solution then was added dropwise to a 0.05 mole fraction of N,N-dimethyl-1,3-propanediamine sample dispersed in 50 milliliters of an ethanol-water solution containing 95% ethanol. The addition of the bis-phenol A fraction to the propanediamine sample was at room temperature (70° F.) over a 15 minute period. There was a slight exotherm during the addition. After all the bis-phenol A was added, the solution was stirred for an hour and then the solvent flashed using a rotary vacuum distillation apparatus. The residual solids were transferred to a vacuum oven to dry, and a N,N-dimethylpropanediamine salt of bis-phenol A was obtained.

EXAMPLE 2

Several powder coating compositions were tested using the amine salts of bis-phenol A of this invention as well as amine salts of other hydroxy compositions or amine salts of bis-phenol A as noted in the prior art. The individual powder coating compositions were prepared by melt mixing a commercially available epoxy powder composition sold under the trademark Shell 2002 epoxy resin by the Shell Oil Company, the epoxy resin having an epoxide equivalent (grams of resin containing 1 gram equivalent weight of epoxide) of 695. This epoxy resin is of the bis phenol A type. The epoxy resin had a particle size of from about ½ inch to a fine powder. The individual epoxy resin formulations comprised 100 weight parts resin (phr) of the 2002 epoxy resin, 1 phr of a leveling agent consisting of a complex, polymeric liquid sold under the trademark MODAFLOW-II by the Monsanto Company, 60 phr titanium dioxide and various levels of catalysts as identified in Table I. These formulations were blended in a Welex high intensity blender for about 1 minute and then melt mixed by extrusion. The extruder used was a Model PR-46 sold by Bus Condux, Incorporated, and the conditions in the extruder were 115° F. in the preheat section, and 210° F. in the outlet extruder section. More particularly, the screw temperature was 110° F., the middle temperature 110° F., and the outlet temperature was 210° F. The extrusion screw was rotated at 100 RPM and the feed screw at 16 RPM. The extruded material was passed through a two roll chill system and formed into a 1/16th inch sheet. The sheet was crushed, pulverized into a powder and sieved through a 200 mesh (74 micron) sieve. Typically, the sieve product then was electrostatically sprayed onto a metal (Bonderite 1000 panel) at various thicknesses, e.g. 1.8 to 2.5 mils and cured under the conditions described.

In Table 1, impact resistance was measured by a standard impact test which included dropping a three-eighths inch steel sphere weighing 2 pounds directly onto the coated Bonderite panel (open), and then onto the uncoated side (reverse). P in both the open direct and open reverse refers to pass and Fs refers to microscopic failure of the coating. The number value for the test is the inch-pounds force withstood. The MEK double rub test was used to determine the resistance of the coating to methylethylketone solvent, and P or F represents pass or fail for 100 double runs. With respect to appearance, S refers to slight discoloration or orange peel, W refers to white, Y refers to yellow, and ORP represents an orange peel effect, i.e., a slightly wrinkled coating surface. The term ORP is not significant of color. The term V is representative of the adjective very which is used to give an indication as to the degree of discoloration, e.g. very yellow. With respect to catalyst nomenclature, BPA represents bis phenol A, DMEA represents dimethyl ethanolamine, (DMPDA) represents N,N-dimethyl-1,3-propanediamine, TMAEP represents N,N,N'-trimethylaminoethyl piperazine, EDA represents ethylenediamine.

TABLE 1

| Catalyst Mole Ratio | Temp. °F. | phr | Coating Thickness Mil | Cure Time Min | Impact ⅜" Sphere (in pds) | | 60° Gloss | MEK double rub | (Pencil) Hardness | Appearance |
|---|---|---|---|---|---|---|---|---|---|---|
| | | | | | Open | Reverse | | | | |
| 1. DMEA-BPA 1:1 | 280° F. | 13 | 2.0 | 20 | 80 | 20 | 90 | 10 | 3H | W-ORP |

TABLE 1-continued

| Catalyst Mole Ratio | Temp. °F. | phr | Coating Thickness Mil | Cure Time Min | Impact ⅛" Sphere (in pds) Open | Reverse | 60° Gloss | MEK double rub | (Pencil) Hardness | Appearance |
|---|---|---|---|---|---|---|---|---|---|---|
| 2. DMEA-BPA 1:1 | " | 13 | | 10 | 20 | 20 | 91 | 5 | 3H | W-ORP |
| 3. TMAEP-BPA 1:1 | insoluble in resin - at 300° F. at 7.5 phr gel time at 360° F. 300 seconds | | | | | | | | | |
| 4. DMPDA dihydroxy-naphthalene 1:2 | 270° F. | 20.8 | - gel time 140 sec. | | | | | | | |
| 5. DMPDA dihydroxy-naphthalene 1:2 | 270° F. | 12.4 | - gel time 300 sec. | | | | | | | |
| 6. DMPDA p,p'-diphenol 1:2 | 270° F. | 14.0 | - gel time 180 sec. | | | | | | | |
| 7. DMPDA p,p'-diphenol 1:2 | 270° F. | 9.3 | - gel time 300 sec. | | | | | | | |
| 8. ethylene-diamine-BPA 1:1 | 270° F. | 5.0 | | | | | | | | |
| ethylene-diamine-BPA 1:1 | 270° F. | " | 2.1 | 45' | | P-0 | 53 | F-2 | 4H | Sl-Y-ORP |
| ethylene-diamine-BPA 1:1 | 270° F. | " | 2.0 | 30' | | P-0 | 61 | F-2 | 4H | " |
| ethylene-diamine-BPA 1:1 | 270° F. | " | 2.2 | 20' | | p-0 | 70 | F-2 | 3H | " |
| ethylene-diamine-BPA 1:1 | 270° F. | " | 2.2 | 15' | | P-0 | 74 | F-2 | 3H | " |
| ethylene-diamine-BPA 1:1 | 270° F. | " | 2.1 | 10' | | P-0 | 79 | F-2 | 3H | " |
| ethylene-diamine-BPA 1:1 | 360° F. | " | 2.1 | 45' | | P-0 | 30 | F-2 | 4H | Sl-Y-ORP |
| ethylene-diamine-BPA 1:1 | 360° F. | " | 2.2 | 30' | | P-0 | 32 | F-2 | 2H | " |
| ethylene-diamine-BPA 1:1 | 360° F. | " | 2.1 | 20' | | P-0 | 34 | F-5 | 3H | " |
| ethylene-diamine-BPA 1:1 | 360° F. | " | 2.3 | 15' | | P-0 | 38 | F-5 | 3H | " |
| ethylene-diamine-BPA 1:1 | 360° F. | " | 2.2 | 10' | | P-0 | 37 | F-2 | 3H | " |
| 9. Isopropylamine BPA 1:2 | 270° F. | 20.4 | 1.5 | 60 | P-120 | P-120 | 82 | F-20 | — | W-ORP |
| 10. 2-methyl-imidazoline BPA 2:1 | 270° F. | 5.0 | 2.1 | 60 | P-0 | P-0 | 100 | 2 | F | |
| 11. Piperazine BPA 1:2 | 270° F. | 5.0 | 1.8 | 15 | P-120 | P-100 | 99 | 20 | 5H | SY-ORP |
| Piperazine BPA 1:1 | 270° F. | 5.0 | 1.8 | 10 | 20 | 0 | 99 | 5 | 4H | " |
| Piperazine BPA | 270° F. | 23.0 | Could not extrude - gelled in extruder | | | | | | | |
| 12. DMPDA BPA 1:1 | 270° F. | 10 | 2.1 | 45 | P-160 | P-160 | 97 | F-30 | 4H | W-ORP |
| DMPDA BPA 1:1 | " | " | 1.9 | 30 | P-160 | P-160 | 93 | F-20 | 4H | W-ORP |
| 12. DMPDA BPA 1:1 | 270° F. | " | 2.0 | 20 | P-160 | P-160 | 90 | F-20 | 4H | W-ORP |
| DMPDA BPA 1:1 | " | " | 1.9 | 15 | P-160 | P-160 | 100 | F-15 | 4H | W-ORP |
| DMPDA BPA 1:1 | " | " | 1.9 | 10 | P-160 | P-160 | 100 | F-10 | 4H | W-ORP |
| DMPDA BPA 1:1 | " | " | 2.1 | 9 | P-160 | P-80 | 97 | F-10 | 4H | W-ORP |
| DMPDA BPA 1:1 | " | " | 1.9 | 8 | P-80 | P-60 | 100 | F-10 | 4H | W-ORP |
| DMPDA BPA 1:1 | " | " | 1.9 | 7 | P-60 | P-20 | 83 | F-10 | 4H | W-ORP |
| DMPDA BPA 1:1 | " | " | 2.1 | 6 | P-40 | P-0 | 84 | F-5 | 4H | W-ORP |
| DMPDA BPA 1:1 | " | " | 2.0 | 5 | P-20 | P-0 | 83 | F-5 | 4H | W-ORP |
| DMPDA BPA 1:1 | " | " | 2.2 | 4 | P-20 | P-0 | 98 | F-2 | 4H | W-ORP |
| DMPDA BPA 1:1 | " | 7 | 1.9 | 45 | P-160 | P-160 | 97 | F-20 | 4H | W-ORP |
| DMPDA BPA 1:1 | " | " | 2.0 | 30 | P-160 | P-120 | 90 | F-20 | 4H | W-ORP |
| DMPDA BPA 1:1 | " | " | 2.0 | 20 | P-140 | P-100 | 99 | F-15 | 4H | W-ORP |
| DMPDA BPA 1:1 | " | " | 2.1 | 15 | P-100 | P-80 | 94 | F-10 | 5H | W-ORP |
| DMPDA BPA 1:1 | " | " | 2.1 | 10 | P-80 | P-80 | 84 | F-5 | 4H | W-ORP |

The melt mix results show that the DMPDA Salts gave good cure times with excellent physical properties at a 10 minute cure. There was no discoloration caused by the catalyst.

EXAMPLE 3

Gel times were measured for several catalysts systems at various levels using an epoxy resin sold under the trademark D.E.R. 663 U, the resin having an epoxide equivalent of 730–840, a softening point of 88°–98° as measured in Durran's mercury method in degrees centigrade, and viscosity of O-S as measured in a 40% solution by weight in DOWANOL glycol ether solvent and a density of 9.9 pounds per gallon. These runs are set forth in Table II and the same nomenclature used in Table 1 applies.

TABLE II

| Catalyst | Temp. °F. | phr | Gel Time (sec) |
| --- | --- | --- | --- |
| 1. (DMPDA) BPA 1:1 | 270 | 15 | 35 |
| 2. (DMPDA) BPA 2:1 | 270 | 10.5 | 56 |
| 3. (DMPDA) BPA 1:1 | 270 | 7 | 70 |
| 4. (DMPDA) BPA 2:1 | 270 | 5.5 | 110 |
| 6. (DMPDA) BPA 2:1 | 270 | 2.3 | 300 |
| 7. (DMPDA) BPA 1:2 | 270 | 5.5 | 270 |
| 8. (DMPDA) BPA 1:2 | 300 | 3.5 | 137 |
| 9. (DMPDA) BPA 1:2 | 300 | 5.0 | 96 |
| 10. (DMPDA) BPA 1:2 | 300 | 10.8 | 47 |
| 11. (DMPDA) BPA 1:2 | 300 | 25 | 32 |
| 12. Dimethyl piperazine BPA 1:2 | 270 |  | 270 |
| 13. Dimethyl piperazine BPA 1:2 | 300 | 25 | 62 |
| 14. Dimethyl piperazine BPA 1:2 | 300 | 20 | 79 |
| 15. Dimethyl piperazine BPA 1:2 | 300 | 5 | 210 |
| 16. Piperazine-BPA 1:1 | 300 | 5 | 123 |
| 17. Triethylene diamine BPA 1:2 | 270 | 5 | 300 |
| 18. Triethylene diamine BPA 2:1 | 270 | 5 | 154 |
| 19. Triethylene diamine | 270 | 5 | 137 |
| 20. (DMPDA) BPA 1:2 | 270 | 5 | 212 |
| 21. (DMPDA)⁻ BPA 2:1 | 270 | 5 | 175 |
| 22. EDA-BPA | 270 | 10 | 64 |
| 23. EDA-BPA | 270 | 15 | 46 |
| 24. EDA-BPA | 270 | 15 | 38 |
| 25. EDA-BPA | 270 | 18.8 | 33 |
| 26. DMPDA BPA 1:1 | 300 | 10 | 34 |
| 27. DMPA | 300 | 1 | 47 |

The results show that the N,N-propane diamine salts of bis phenol A have good gel times at low temperatures. The differences in terms of results are readily noted.

What is claimed is:

1. A latent curable epoxy resin composition having excellent shelf life at ambient temperature with an excellent cure rate at an elevated temperature which comprises a finely divided epoxy resin having a plurality of 1,2 epoxy groups, a lower softening point of not less than 40° C. and having distributed therein a catalytic quantity of an amine salt of bis-phenol A said amine represented by the formula:

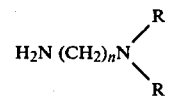

wherein n is 2 or 3, and R is a $C_1$–$C_4$ alkyl group.

2. The latent composition of claim 1 wherein said amine salt is present in a proportion of from about 2–10 parts per 100 parts by weight of epoxy resin.

3. The latent composition of claim 2 wherein the ratio of amine to bis-phenol A is approximately 1:1.

4. The latent composition of claim 2 wherein said amine is N,N-dimethyl-1,3-propane diamine.

5. In a process for curing a finely divided 1,2-epoxy resin having a lower softening point of not less than 40° C. comprising heating said epoxy resin to an elevated temperature in the presence of a catalyst, the improvement which comprises heating said epoxy resin in the presence of an effective proportion of an amide salt of bis-phenol A said amine represented by the formula:

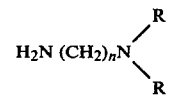

wherein n is 2 or 3, and R is a $C_1$–$C_4$ alkyl group.

6. The process of claim 5 wherein said amine salt is present in a proportion of from about 2–10 parts by weight per 100 parts of epoxy resin.

7. The process of claim 6 wherein said amine is N,N-dimethyl-1,3-propane diamine.

8. The reaction product of N,N-dimethyl-1,3-propane diamine and bis-phenol A.

* * * * *